July 11, 1933. A. H. BRINVILLIERS 1,917,695
ROOF AND COVER, PARTICULARLY ADAPTED FOR MOTOR CARS AND THE LIKE
Original Filed Sept. 22, 1931 2 Sheets-Sheet 1
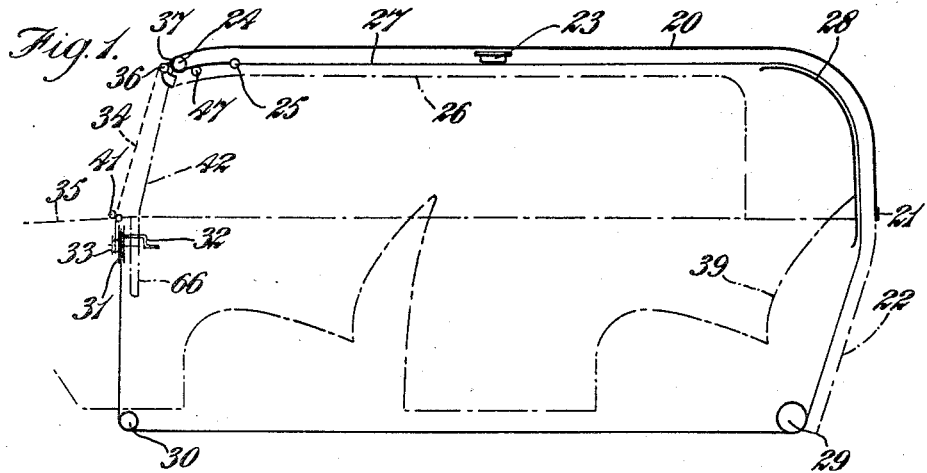
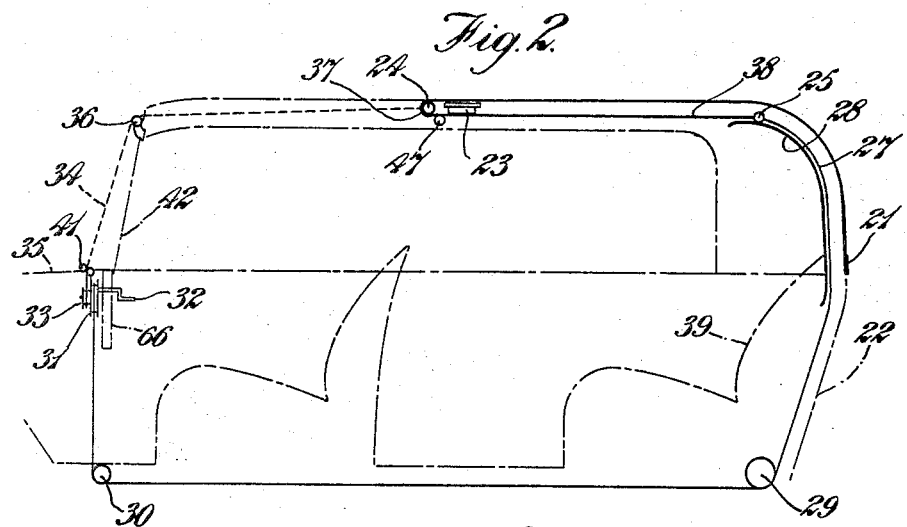
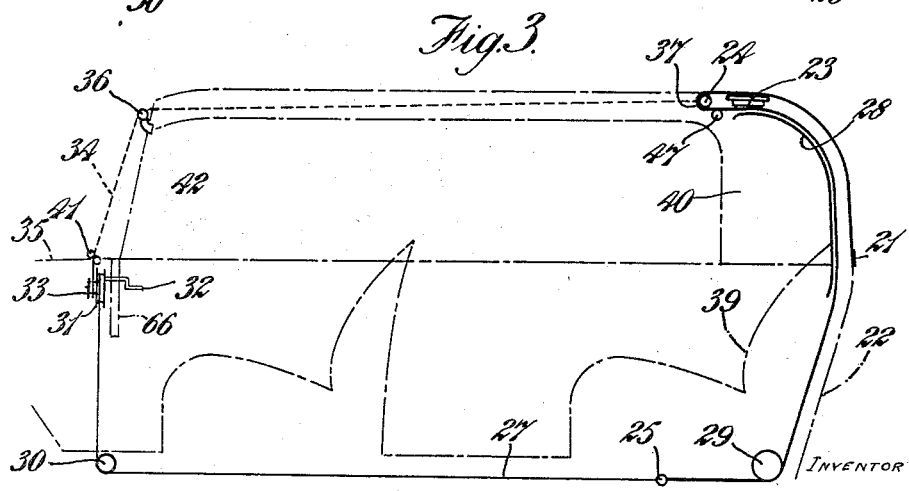
INVENTOR
A. H. Brinvilliers
By Lacey & Lacey
ATTORNEYS

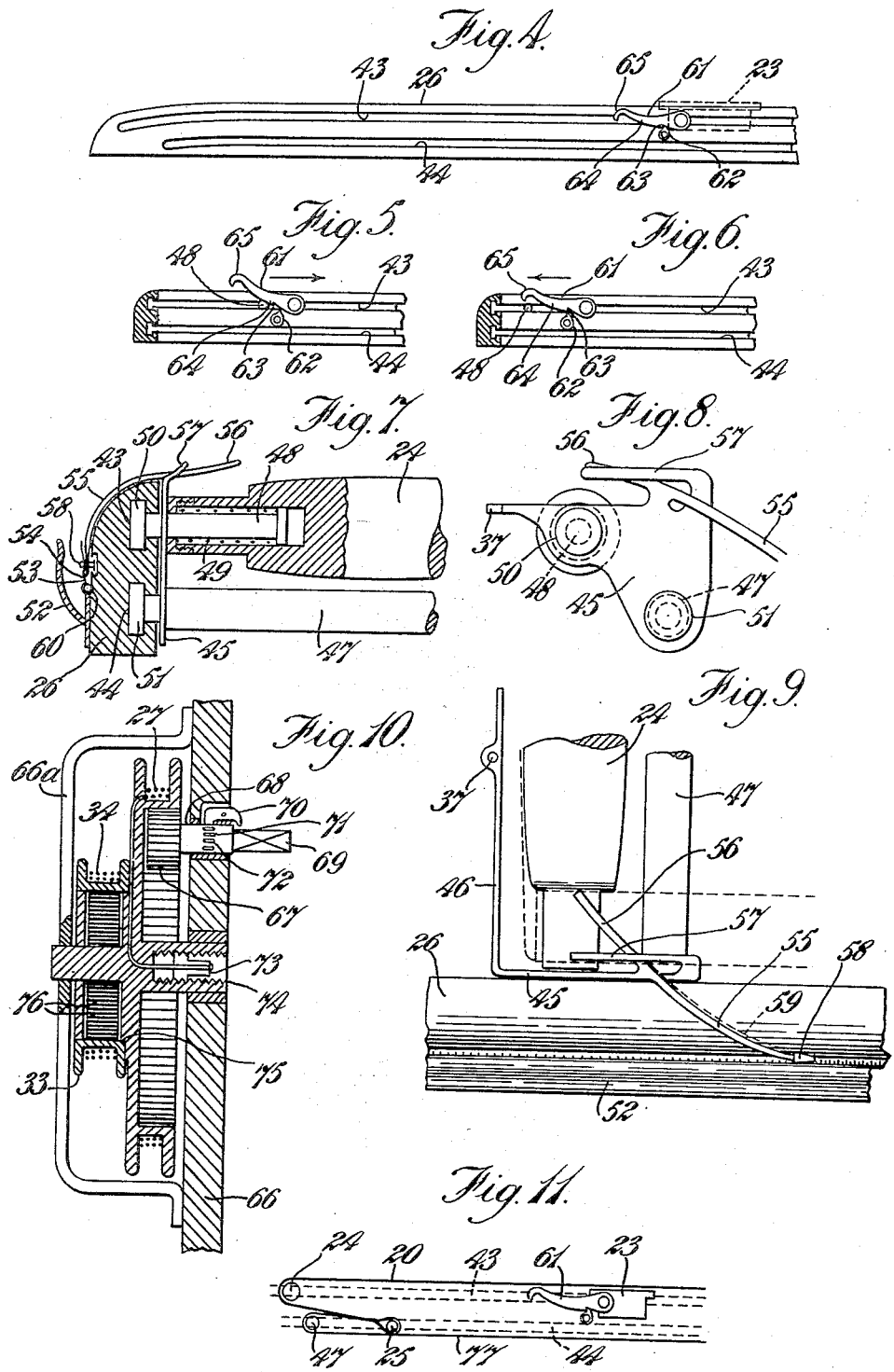

Patented July 11, 1933

1,917,695

UNITED STATES PATENT OFFICE

ARTHUR HENRY BRINVILLIERS, OF CHELSEA, LONDON, ENGLAND

ROOF AND COVER, PARTICULARLY ADAPTED FOR MOTOR CARS AND THE LIKE

Application filed September 22, 1931, Serial No. 564,435, and in Great Britain September 22, 1930.
Renewed May 12, 1933.

This invention relates to roofs and covers particularly adapted for motor cars and the like, and has for its object to provide an improved and simplified construction of roof which, though normally giving a car or coach an appearance of a saloon, may be adjusted at will to form a town brougham, an open brougham, or in some cases a touring car.

According to the invention, there is provided a roof or cover for motor cars and the like in which the fabric or material of the roof is doubled back upon itself adjacent to one edge about a transverse roller or the equivalent, and said edge is adapted to be drawn across the surface of the remaining undeflected material in a direction at right angles to the roller or equivalent; the arrangement being such that the roller or equivalent is retained at the line of deflection of the material.

Thus, a roof or cover for motor cars and the like may comprise a strip or sheet of flexible material secured at one end to the rear of the car and may extend forwardly around a transverse roller or equivalent so that movement of the "forward" end of the material towards the rear of the car causes the roller to be moved rearwardly at half the speed of travel of the material.

The material is preferably secured to the side members of the body substantially below the upper edge of said members and is attached by means of fasteners of the sliding clasp type, the actuating means of which are operatively connected with the roller or equivalent for movement therewith.

Flexible cords or equivalent, operable by means of winding gear disposed upon or adjacent to the dashboard of the car, may be used for actuating the cover; the cord adapted to be secured to the roller for drawing the latter forwardly being connected with the winding mechanism through the medium of a spring-influenced reel or the like.

Moreover, the means for operating the sliding clasp fasteners may be adapted to turn-in the edges of the material as the latter passes over the roller, which roller may be mounted in a frame or carriage, if desired, for allowing sliding movement in a direction laterally of said roller and longitudinally of the car. The roller frame or carriage and other transverse supports may be of telescopic construction so that their lengths may vary in accordance with the width of the roof or cover while the roller may progressively increase in diameter towards its centre so as to provide curvature in the roof surface.

The invention is illustrated in the accompanying diagrammatic drawings, in which:—

Figure 1 is a side elevation of a body of a car showing the general arrangement of the hood and operating means with the roof fully closed;

Figure 2 is a view corresponding to Figure 1, showing the roof partly open, as would be required for forming a town-brougham;

Figure 3 is a similar view to Figures 1 and 2 showing the roof opened to form an open-brougham;

Figure 4 is an interior side elevation of one of the upper side members of the body work showing the slides for the roof;

Figures 5 and 6 show in interior side elevation one form of catch for locating the transverse supporting member;

Figure 7 is a part sectional front elevation through the roller and side member;

Figure 8 is an exterior end elevation of the roller frame;

Figure 9 is a plan view corresponding to Figure 8 showing a portion of the corresponding side member;

Figure 10 is a diagrammatic sectional elevation of a form of winding mechanism, and Figure 11 shows a modified arrangement of cover incorporating an interior lining.

As shown diagrammatically in Figures 1 to 3, the roof surface is composed of a sheet or strip 20 of fabric or other material and is secured at its rear end 21 to the body work 22 of the car, which is indicated in broken lines. The fabric 20 is supported upon a transverse supporting bar 23 and, passing over a roller 24, is secured to an operating bar 25. The transverse bar 23, roller 24 and operating bar 25 are slidably mounted in grooves formed in the side members 26 of the body work, as will hereinafter be described, so as to allow movement in a direction longitudinally of the car.

The means for operating the roof or cover comprise a wire cable, chain or the equivalent 27 secured to the operating bar 25 and passing rearwardly of the body 22 where it is guided by a shield 28 over rollers 29 and 30 disposed below the floor of the vehicle and thence to the larger drum 31 of a winding mechanism, operated by means of a handle 32. A similar drum 33 approximately half the diameter of the drum 31 is operatively connected with the handle 32 for winding up a cable 34, the drum 33 being spring-influenced to draw in the cable 34 through a hole or guide in the upper surface 35 of the scuttle of the vehicle. Owing to the spring drive of the drum 33, however, the cable 34 may be pulled out, as indicated by the dotted lines, passed over a pulley 36 and secured to an eye or equivalent 37 for pulling the roller 24 in a forward direction.

Thus, when it is required to dispose of a part or the whole of the roof surface, as shown in Figures 2 and 3 respectively, the handle 32 is rotated, thus winding up the cable 27 upon the drum 31 and drawing the operating bar 25 back alongside the interior surface of the roof material 20, the latter being deflected around the roller 24 as said roller progressively moves rearwardly of the vehicle. The "forward" end 38 of the material 20 is guided around the shield 28 and passes within the thickness of the body work and behind the rear seat 39, as shown in Figure 3. As the roller 24 reaches the transverse supporting bar 23, the latter is automatically released and is pushed rearwardly. In the example shown in the drawings, the rear portion 40 of the roof and upper portion of the body work is retained permanently in position, so that when the roof or cover is withdrawn to the position shown in Figure 3, a town-brougham is formed.

The winding mechanism is arranged so that as the cable 27 is wound upon the drum 31 the driving mechanism of the drum 33 is rotated in a direction to pay-out the cable 34 but, owing to the spring incorporated in the drum 33, the cable 34 is retained thereon. When it is desired to replace the roof, the end of the cable 34, which is preferably provided with a hook 41, is pulled out against the spring influence and is secured to the eye 37, so that movement of the handle in the opposite direction causes the cable 34 to be drawn in and the cable 27 to be paid out, thus pulling back the material 20 so as to restore the roof. When this operation has been performed as far as desired, the cable 34 may be released from the eye 37 and will be drawn in under the spring influence and wound upon the drum 33 until the hook 41 encounters the surface 35 of the scuttle. By this means inconvenience due to the presence of the cable 34 stretching across the windscreen 42 and the open portion of the roof area is completely avoided.

Figures 4 to 10 show various details of construction whereby this result is obtained, although it will be observed that various other operating means may be employed without departing from the present invention.

The interior surface of each of the side members 26 is formed with two longitudinal grooves 43 and 44 each of T-shaped cross section, as shown diagrammatically in Figures 5 and 6. The roller 24 is mounted rotatably in a sliding carriage (see Figures 7, 8 and 9) comprising end plates 45, a front cross bar 46 and a rear cross bar 47, the bearing for the roller 24 comprising a plunger 48 inserted into each end of the roller 24 and influenced to move inwardly in an axial direction by means of a compression spring 49, the head 50 of the plunger being slidably engaged within the groove 43, the lower wall of which serves as a rail. The rear cross bar 47 is also provided at each end with a head 51, which similarly slides within the groove 44 so that the roller 24 is always located at right angles to the longitudinal axis of the car.

The upper surface of the rail 26 conforms to the usual curvature of the body work and is provided with a gutter 52 with which is incorporated the stationary portion 53 of a sliding clasp fastener 54, one of which is provided along each side edge of the roof.

The side plate 45 is formed with three outstanding fingers 55, 56 and 57 for unfastening and manipulating the margins of the roof material 20. The finger 55 extends closely around the curved surface of the side rail 26 and is secured at its lower end to the operating member 58 (see Figure 9) of the fastener, so that as the roller 24 travels rearwardly, the operating member 58 precedes it and unfastens the material of the roof so that the free edge of the latter is guided along the finger 55 and then along the finger 56, as indicated by the dotted line 59. The material 20 is looped around the finger 57, which thereby locates the fold in the material, so that the latter passes around the roller 24 folded inwards at its edges as shown in Figure 9, the end portion of the roller 24 being of reduced diameter in order to accommodate the extra thickness of material. It will be observed that by this means the fastening of the roof material may be disposed at some distance below the upper surface of the rails 26, so that both leakage of rain into the interior of the car and the presence of unsightly margins of fabric when the roof or cover is removed, are avoided. The stationary portion 53 of the fastening is preferably beaded and held within an undercut channel 60 in order to permit longitudinal adjustment of the fastener to compensate for local or general stretching of the material 20 and to enable easy replacement or removal of the portion 53.

In some cases the fastening of the roof fabric may be disposed adjacent to the inner edges of the side rails and at their upper edges, thus dispensing with the fingers 55, 56 and 57 comprising the turning-in mechanism, a flexible or other beading being provided upon the fabric to engage with a beading formed on the corresponding side rail to prevent the ingress of rain when the roof is in position.

In cases where the front portion of the roof is narrower than the rear, the roller 24 and the front and rear transverse rods 46 and 47 may be of telescopic construction to accommodate the variation in length which is required, while the necessary resistance to sliding is obtained by the clamping action of the compression spring 49.

It will be seen from Figures 1 to 3 that the transverse supporting bar 23 is normally disposed about half-way along the length of the cover but is pushed rearwardly by the roller 24. The mechanism for effecting this action comprises a catch 61 pivoted to the transverse supporting bar 23 and adapted to co-operate with a stop 62 secured to the rail 26 between the grooves 43 and 44. Normally the V-shaped opening 63 co-operates with the stop 62 and prevents the rearward movement of the bar 23, but as the roller 24 moves rearwardly, the plunger 48 bears against the cam surface 64 on the catch 61 and moves this upwardly, as shown in Figure 5, so that it is released from the stop 62 and is pushed rearwardly with the roller 24. When, however, the roller 24 moves forwardly, the plunger 48 engages the hooked portion 65 of the catch 61 and pulls the bar 23 in a forward direction until the stop 62 bears against the cam surface 64. This causes the hook 65 to be raised, thus releasing the plunger 48 and allowing the roller 24 to travel forward alone, while this movement simultaneously brings the opening 63 into engagement with the stop 62, as shown in Figure 6.

A form of winding mechanism is shown diagrammatically in Figure 10, in which the drum 31 is pivotally mounted behind the dash-board 66 by means of a bracket 66a, and is formed with internal gear teeth which are driven by means of a pinion 67 having a spindle 68 squared at the end 69 for the accommodation of the winding handle 32. A pivoted catch member 70 is mounted adjacent to the spindle 68 and is formed with a projection 71 which drops into one of a number of keyways 72 formed in the shaft so as to prevent rotation of said shaft when the handle 32 is withdrawn. As said handle 32 is pushed over the squared portion 69, the projection 71 is moved out of the keyway 72 so as to allow rotation of the spindle 68. The end of the cable 27 passes to the centre of the drum 31 and is anchored to a screw plug 73 which may be adjusted axially within the spindle 74 of the drum 31 to compensate for stretching of the cables and roof material. The drum 33 is freely mounted at the rear of the drum 31 upon bushes 75 and is coupled with the spindle 74 by means of a spiral spring 76 so that when said spring 76 is fully wound-up the rotation of the spindle 74 is transmitted directly to the drum 33. The spring 76 is so arranged that it is fully wound-up when the cable 34 is attached to the carriage of the roller 24 by means of the eye 37 and hook 41, so that when this operation has been performed rotation of the handle 32 in one direction causes the cable 34 to be drawn in at half the rate that the cable 27 is paid-out, the spring remaining fully wound until the hook 41 is released from the eye 37 and the cable 34 is allowed to coil itself upon the drum 33.

The roof or cover may be arranged with an internal lining 77 (see Figure 11) which is passed upwardly over the cross bar 47 and is secured to the operating bar 25, which latter slides in the groove 44.

It will be observed that the constructional details may take a number of different forms, and, if desired, the rear portion 40 may be arranged to fold down after the roof has been drawn into its fullest extent, while the arrangement according to the present invention may be modified to suit all types of vehicle bodies. Moreover, the invention may be suitably adapted for use with covers of all kinds, such, for instance, as those for aeroplanes, airships, motorboats and the like.

What I claim then is:—

1. A cover for motor cars and the like comprising a strip of flexible material anchored at one end to the car body and looped upon itself, longitudinal guides disposed above the car body, a transverse member shiftable in said guides in a direction longitudinally of the flexible material and engaged in the bight of the loop of the flexible material, means operatively connected to the free end of the flexible material for shifting said transverse member forwardly and rearwardly of the guides to lengthen and shorten said loop of the flexible material, means for detachably securing the edges of the flexible material to the guides, and means carried by the transverse member for simultaneously unfastening the edges of the material from the guides and folding said edges inwardly upon themselves to overlap the ends of the transverse member during shifting of the transverse member.

2. A cover for motor cars and the like comprising a strip of flexible material anchored at one end to the car body and looped upon itself, longitudinal guides carried by the body, a transverse roller in the bight of the loop of the flexible material shiftable longitudinally of the guides and having the ends tapered, means operatively connected to the free end of the strip and to the transverse member and simultaneously moving said roller longitudinally of the guides and lengthening and shortening the loop of the flexible material, snap fasteners operatively connecting the edges of the flexible strips with the guides, and fingers movable as a unit with the transverse roller adapted to simultaneously unfasten said fasteners and fold the edges of the flexible strip inwardly upon the tapered ends of the roller during shifting movement of the roller longitudinally of the guides.

3. A cover for motor vehicles and the like comprising a strip of flexible material anchored at the rear end to the body, said flexible material being looped upon itself over the top of the body, a roller disposed in the bight of the loop and having tapered ends, longitudinal guides carried by the body supporting the roller for movement forwardly and rearwardly of the body, a windlass carried by the body, an operative connection between the windlass and the roller and the free end of the flexible material for moving the roller longitudinally of the guides and lengthening or shortening the loop in the flexible material to cover a predetermined extent of the body and form a partial or complete roof for the body, and means carried by the roller for folding the edges of the flexible strip inwardly during movement of the roller to lie upon the tapered ends of the roller.

4. A cover for motor cars and the like comprising a strip of flexible material anchored at one end to the car body and looped upon itself, longitudinal guides disposed above the car body, a transverse member shiftable in said guides in a direction longitudinally of the flexible material and engaged in the bight of the loop of the flexible material, means operatively connected to the free end of the flexible material for shifting said transverse member forwardly and rearwardly of the guides to lengthen and shorten said loop of the flexible material, and means for detachably securing the edges of the flexible material to the guides.

ARTHUR HENRY BRINVILLIERS.